United States Patent
Zhang et al.

(10) Patent No.: US 12,494,004 B2
(45) Date of Patent: Dec. 9, 2025

(54) SYSTEMS AND METHODS FOR FEEDBACK BASED INSTRUCTIONAL VISUAL EDITING

(71) Applicant: Salesforce, Inc., San Francisco, CA (US)

(72) Inventors: Shu Zhang, Fremont, CA (US); Xinyi Yang, Palo Alto, CA (US); Yihao Feng, Austin, TX (US); Ran Xu, Mountain View, CA (US); Ning Yu, Palo Alto, CA (US); Chia-Chih Chen, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 272 days.

(21) Appl. No.: 18/350,876

(22) Filed: Jul. 12, 2023

(65) Prior Publication Data

US 2024/0303882 A1    Sep. 12, 2024

Related U.S. Application Data

(60) Provisional application No. 63/489,131, filed on Mar. 8, 2023.

(51) Int. Cl.
*G06T 11/60* (2006.01)
*G06T 5/70* (2024.01)

(52) U.S. Cl.
CPC .............. *G06T 11/60* (2013.01); *G06T 5/70* (2024.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 12,131,406 | B2 * | 10/2024 | Liu | G06T 5/70 |
| 12,299,796 | B2 * | 5/2025 | Liu | G11B 27/28 |
| 2024/0355022 | A1 * | 10/2024 | Shi | G06T 9/00 |

OTHER PUBLICATIONS

Tim Brooks et al. Instructpix2pix: Learning to follow image editing instructions. arXiv preprint arXiv:2211.09800, 2022.
Kimin Lee et al. Aligning textto- image models using human feedback. arXiv preprint arXiv:2302.12192, 2023.

* cited by examiner

*Primary Examiner* — Yanna Wu
(74) *Attorney, Agent, or Firm* — Haynes and Boone, LLP

(57) ABSTRACT

Embodiments described herein provide a feedback based instructional image editing framework that employs a diffusion process to follow user instruction for image editing. A diffusion model is fine-tuned using a reward model, which may be trained via human annotation. The training of the reward model may be done by having the image editing model output a number of images, which a human annotator ranks based on their alignment with the original image and a given instruction.

20 Claims, 16 Drawing Sheets

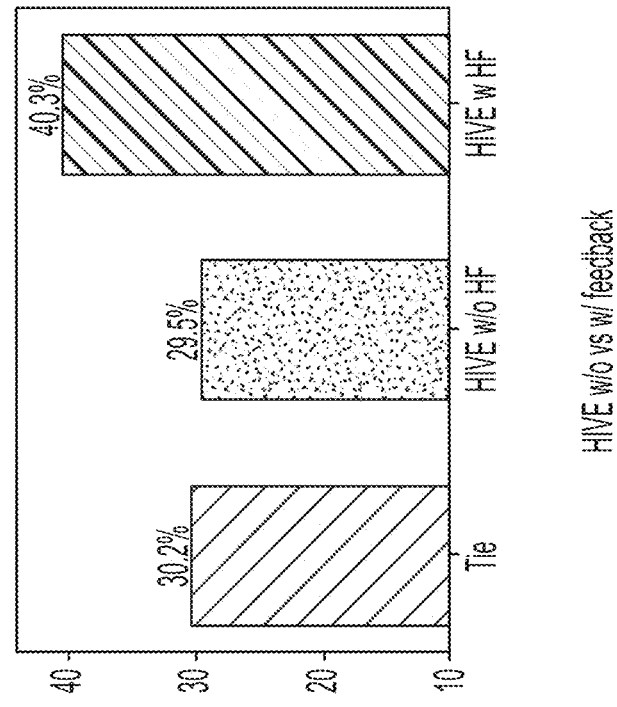
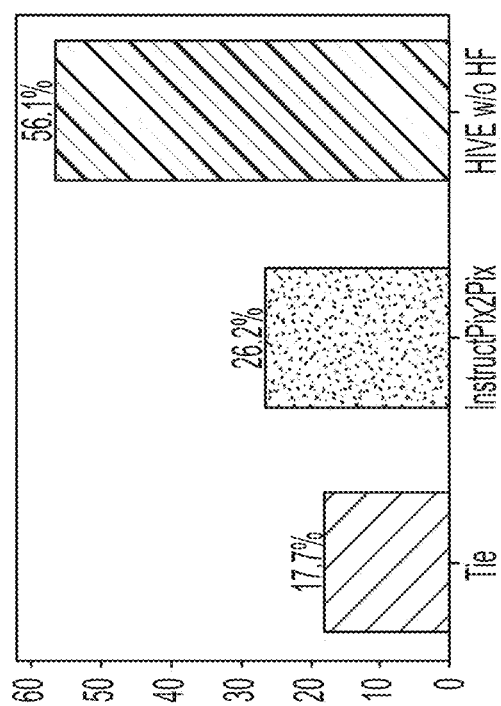
FIG. 10B
FIG. 10A

SYSTEMS AND METHODS FOR FEEDBACK BASED INSTRUCTIONAL VISUAL EDITING

CROSS REFERENCE(S)

The instant application is a nonprovisional of and claim priority under 35 U.S.C. 119 to U.S. provisional application No. 63/489,131, filed Mar. 8, 2023, which is hereby expressly incorporated by reference herein in its entirety.

TECHNICAL FIELD

The embodiments relate generally to natural language processing and machine learning systems, and more specifically to feedback based instructional visual editing.

BACKGROUND

Machine learning systems have been widely used in generating text and images. For example, a generative model may be used to generate an image given a text prompt. Editing of an existing image may also be accomplished based on text prompting. However, current image editing models have issues with consistently aligning a given image to a text prompt (i.e., the resulting image fails to adhere to the user prompt). Therefore, there is a need for methods of training image editing models for improved alignment between prompts and edited images.

BRIEF DESCRIPTION OF THE DRAWINGS

FIGS. 10A-10B provide charts illustrating exemplary performance of embodiments described herein.

Figure 1:
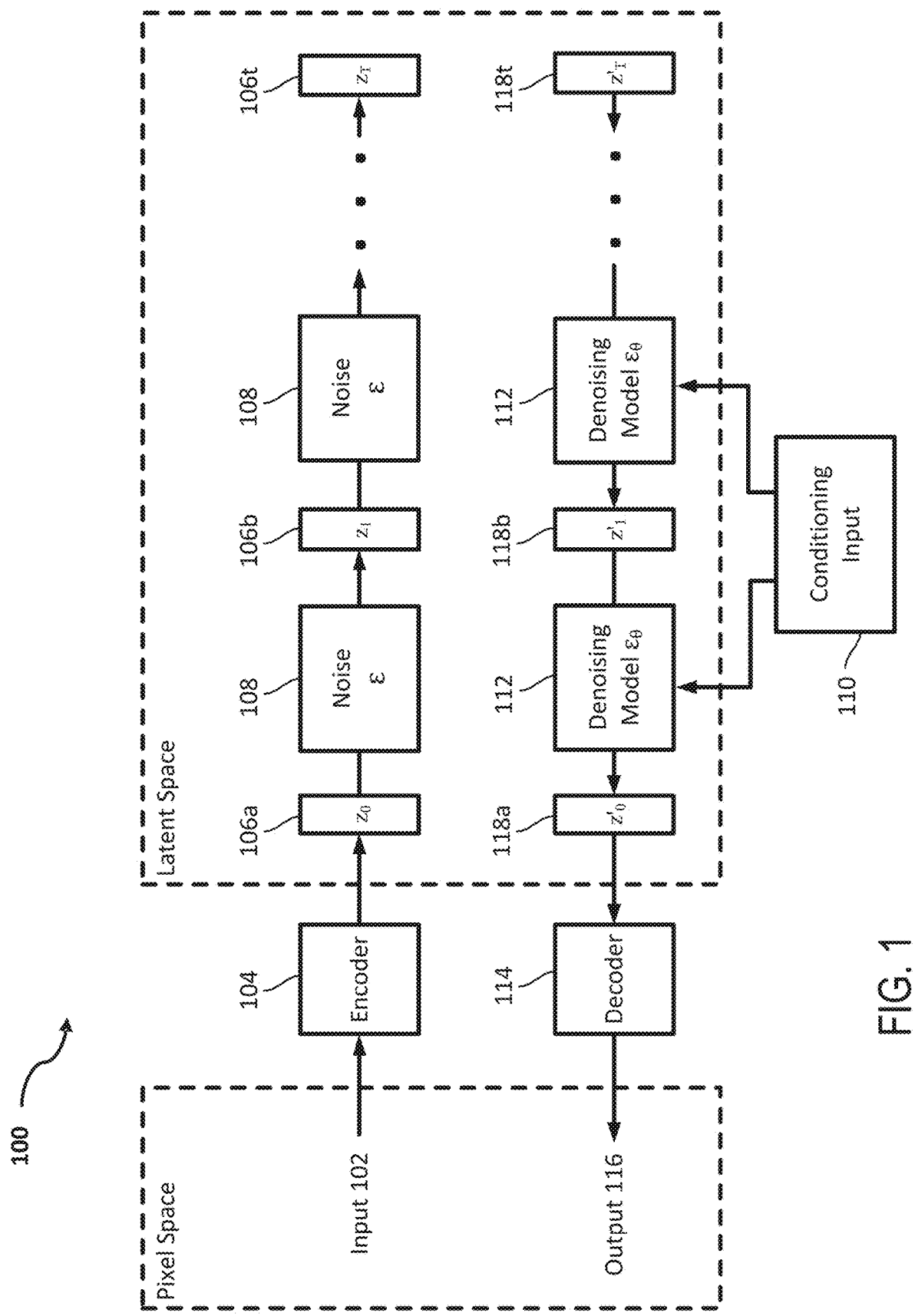
FIG. 1 is a simplified diagram illustrating an exemplary training framework for a denoising diffusion model according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Image generative models may perform the alignment between a text and an image. An important application in content generation is image editing. A diffusion process may often be employed for image editing.

Machine learning systems have been widely used in generating text and images. For example, a generative model may be used to generate an image given a text prompt. Editing of an existing image may also be accomplished based on text prompting. For example, an existing image may be paired with a caption describing the image, and an edited caption describing a desired modified version of the image (e.g., "a hand holding a sphere" and "a hand holding a cube"). Image editing may also be performed by providing a single editing instruction if the model is trained to receive such a prompt (e.g., "replace the sphere with a cube). However, current image editing models have issues with consistently aligning a given image to a text prompt (i.e., the resulting image fails to adhere to the user prompt).

In view of the need for methods of training image editing models for improved alignment between prompts and edited images, embodiments described herein provide an instructional image editing framework that employs human feedback for fine-tuning the image editing model. In some embodiments, human annotation is used to rank the alignment of images to a text instruction. The human annotation is then used to train a reward model, and the reward model is used in fine-tuning an image editing model (e.g., a diffusion model configured to edit an image according to a user instruction).

To train the reward model, in some embodiments, the diffusion model is used to generate multiple variants of an image for a given input image/instruction pair. Human annotators rank these image outputs. The human annotation is used as ground truth labels to train the reward model, which predicts a reward score in response to the trio of {output image, input image, instruction}.

The diffusion model is then fine-tuned utilizing the trained reward model. Specifically, given an original image, an instruction, and an edited image generated by the diffusion model, the reward model predicts a reward score. The diffusion model is fine-tuned using a loss objective that is based on the reward score. After fine-tuning the diffusion model, it may be used at inference to generate edited images which are more aligned with the input image/instruction (i.e., a high reward score). The framework described herein may be referred to herein as harnessing Human feedback for Instructional Visual Editing (HIVE).

Embodiments described herein provide a number of benefits. For example, quantitative and qualitative improvements in images generated using models trained by HIVE as discussed in more detail with reference to FIGS. 9-14. The performance is able to be achieved with a smaller dataset than existing methods, thereby reducing the amount of computation and memory necessary to achieve the same or better performance. The improved alignment between an editing instruction and the final image allows for fewer resources needing to be allocated to prompt engineering/prompt tuning. Therefore, with improved performance on image editing, neural network technology in image editing models (e.g., diffusion models) is improved.

Overview

FIG. 1 is a simplified diagram illustrating an exemplary training framework 100 for a denoising diffusion model for generating or editing an image given a conditioning input such as a text prompt. In some embodiments, visual editing model 250 (described in FIG. 2) is trained or pre-trained according to training framework 100. In one embodiment, a denoising diffusion model is trained to generate an image (e.g., output 116) based on a user input (e.g., a text prompt in conditioning input 110). At inference, the denoising diffusion model may receive a text prompt describing image content, and start with a random noise vector as a seed vector, and the denoising model progressively removes "noise" from the seed vector as conditioned by the user input (e.g., text prompt) such that the resulting image may gradually align with the user input. Completely removing the noise in a single step would be infeasibly difficult computationally. For this reason, the denoising model is trained to remove a small amount of noise, and the denoising step is repeated iteratively so that over a number of iterations (e.g., 50 iterations), the image eventually becomes clear.

Framework 100 illustrates how such a diffusion model may be trained to generate an image given a prompt by gradually removing noise from a seed vector. The top portion of the illustrated framework 100 including encoder 104 and the noise ε 108 steps may only be used during the training process, and not at inference, as described below. A training dataset may include a variety of images, which do not necessarily require any annotations, but may be associated with information such as a caption for each image in the training dataset that may be used as a conditioning input 110. A training image may be used as input 102. Encoder 104 may encode input 102 into a latent representation (e.g., a vector) which represents the image.

In some embodiments, a diffusion model may be trained using the pixel-level data directly. In other embodiments, a diffusion model may be trained on scaled down versions of images. Generally some form of encoder 104, however, is desirable so that the image is in a format which is more easily consumed by the denoising model $\epsilon_\theta$ 112. The remaining description of framework 100 presumes encoder 104 generates a latent vector representation of input 102.

Latent vector representation $z_0$ 106a represents the first encoded latent representation of input 102. Noise ε 108 is added to the representation $z_0$ 106a to produce representation $z_1$ 106b. Noise ε 108 is then added to representation $z_1$ 106b to produce an even noisier representation. This process is repeated T times (e.g., 50 iterations) until it results in a noised latent representation $z_T$ 106t. The random noise ε 108 added at each iteration may be a random sample from a probability distribution such as Gaussian distribution. The amount (i.e., variance) of noise ε 108 added at each iteration may be constant, or may vary over the iterations. The amount of noise ε 108 added may depend on other factors such as image size or resolution.

This process of incrementally adding noise to latent image representations effectively generates training data that is used in training the diffusion denoising model 112, as described below. As illustrated, denoising model $\epsilon_\theta$ 112 is iteratively used to reverse the process of noising latents (i.e., perform reverse diffusion) from $z'_T$ 118t to $z'_0$ 118a. Denoising model $\epsilon_\theta$ 112 may be a neural network based model, which has parameters that may be learned. Input to denoising model $\epsilon_\theta$ 112 may include a noisy latent representation (e.g., noised latent representation $z_T$ 106t), and conditioning input 110 such as a text prompt describing desired content of an output image, e.g., "a hand holding a globe." As shown, the noisy latent representation may be repeatedly and progressively fed into denoising model 112 to gradually remove noise from the latent representation vector based on the conditioning input 110, e.g., from $z'_T$ 118t to $z'_0$ 118a.

Ideally, the progressive outputs of repeated denoising models $\epsilon_\theta$ 112 $z'_T$ 118t to $z'_0$ 118a may be an incrementally denoised version of the input latent representation $z'_T$ 118t, as conditioned by a conditioning input 110. The latent image representation produced using denoising model $\epsilon_\theta$ 112 may be decoded using decoder 114 to provide an output 116 which is the denoised image.

In one embodiment, the output image 116 is then compared with the input training image 102 to compute a loss for updating the denoising model 112 via back propagation. In another embodiment, the latent representation 106a of input 102 may be compared with the denoised latent representation 118a to compute a loss for training. In another embodiment, a loss objective may be computed comparing the noise actually added (e.g., by noise ε 108) with the noise predicted by denoising model $\epsilon_\theta$ 112. Denoising model $\epsilon_\theta$ 112 may be trained based on this loss objective (e.g., parameters of denoising model $\epsilon_\theta$ 112 may be updated in order to minimize the loss by gradient descent using backpropagation). Note that this means during the training process of denoising model $\epsilon_\theta$ 112, an actual denoised image does not necessarily need to be produced (e.g., output 116 of decoder 114), as the loss is based on each intermediate noise estimation, not necessarily the final image.

In one embodiment, conditioning input 110 may include a description of the input image 102, and in this way denoising model $\epsilon_\theta$ 112 learns to reproduce the image described. Alternatively (or in addition), conditioning input 110 may include a text prompt, a conditioning image, an attention map, or other conditioning inputs. These inputs may be encoded in some way before being used by denoising model $\epsilon_\theta$ 112. For example, a conditioning image may be encoded using an encoder similar to encoder 104. Conditioning input 110 may also include a time step, which may be used to provide the model with a general estimate of how much noise remains in the image, and the time step may increment (or decrement) for each iteration.

The direct output of denoising model $\epsilon_\theta$ 112 may be an estimation of the noise present in the input latent representation, or more generally a noise distribution. In this sense, the direct output may not by a latent representation of an image, but rather of the noise. Using this estimated noise, however, an incrementally denoised image representation may be produced which may be an input to the next iteration of denoising model $\varepsilon_\theta$ 112.

At inference, denoising model $\varepsilon_\theta$ 112 may be used to denoise a latent image representation given a conditioning input 110. Rather than a noisy latent image representation $z_T$ 106t, the input to the sequence of denoising models may be a randomly generated vector which is used as a seed. Different images may be generated by providing different random starting seeds. The resulting denoised latent image representation after T denoising model steps may be decoded by a decoder (e.g., decoder 114) to produce an output 116 of a denoised image. For example, conditioning input may include a description of an image, and the output 116 may be an image which is aligned with that description.

Note that while denoising model $\varepsilon_\theta$ 112 is illustrated as the same model being used iteratively, distinct models may be used at different steps of the process. Further, note that a "denoising diffusion model" may refer to a single denoising model $\varepsilon_\theta$ 112, a chain of multiple denoising models $\varepsilon_\theta$ 112, and/or the iterative use of a single denoising model $\varepsilon_\theta$ 112. A "denoising diffusion model" may also include related features such as decoder 114, any pre-processing that occurs to conditioning input 110, etc. This framework 100 of the training and inference of a denoising diffusion model may further be modified to provide improved results and/or additional functionality, for example as in embodiments described herein.

Figure 2:
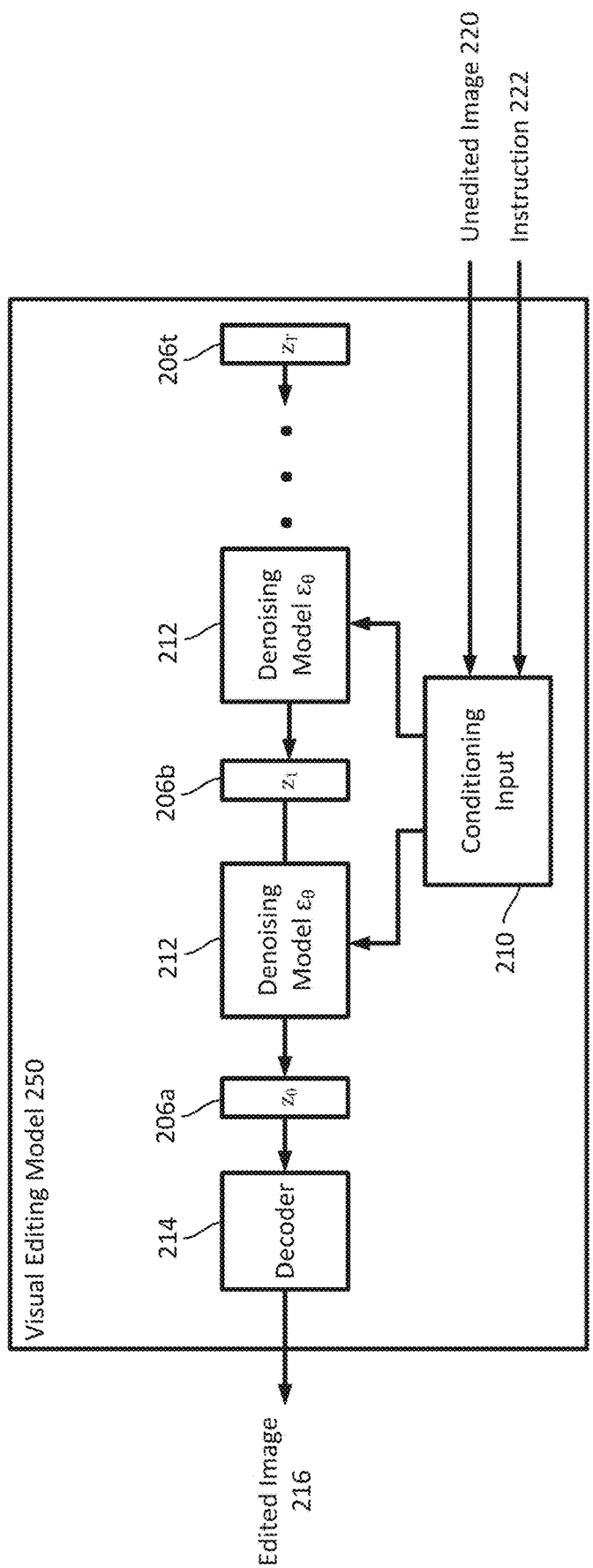
FIG. 2 is a simplified diagram of a visual editing model, according to some embodiments.

FIG. 2 is a simplified diagram of a visual editing model 250. In some embodiments, visual editing model 250 is trained or pre-trained according to training framework 100, or by similar training methods. Visual editing model 250 generates an edited image 216 based on an unedited image 220, and an instruction 222. For example, an unedited image 220 may be an image of a hand holding a sphere, the instruction 222 may be "change the sphere to a cube", and the edited image 216 may be an image of the same hand as the unedited image 220 but holding a cube. Visual editing model 250 comprises a denoising model $\varepsilon_\theta$ 212 which is configured to be used iteratively in a sequential fashion similar to denoising model $\varepsilon_\theta$ 112 in FIG. 1.

At inference, latent image representation 206t may be initialized with random noise, and input to the first iteration of denoising model $\varepsilon_\theta$ 212, which iteratively denoises latent image representations (e.g., latent representations 206a and 206b). During training, latent image representation 206t may be initialized by iteratively noising a target edited image. Denoising model $\varepsilon_\theta$ 212 denoises as conditioned by conditioning input 210, similar to conditioning input 110 in FIG. 1. Conditioning input 210 is based on the unedited image 220, and the instruction 222. Visual editing model 250 further comprises a decoder 214 (similar to decoder 114 in FIG. 1) which decodes a latent image representation into an image, thereby providing an edited image 216. Parameters of denoising model $\varepsilon_\theta$ 212, conditioning input 210, or other aspects of visual editing model 250 may be learned and/or fine-tuned according to methods described herein. Training of visual editing model 250 is described in reference to FIG. 4B.

Figure 3:
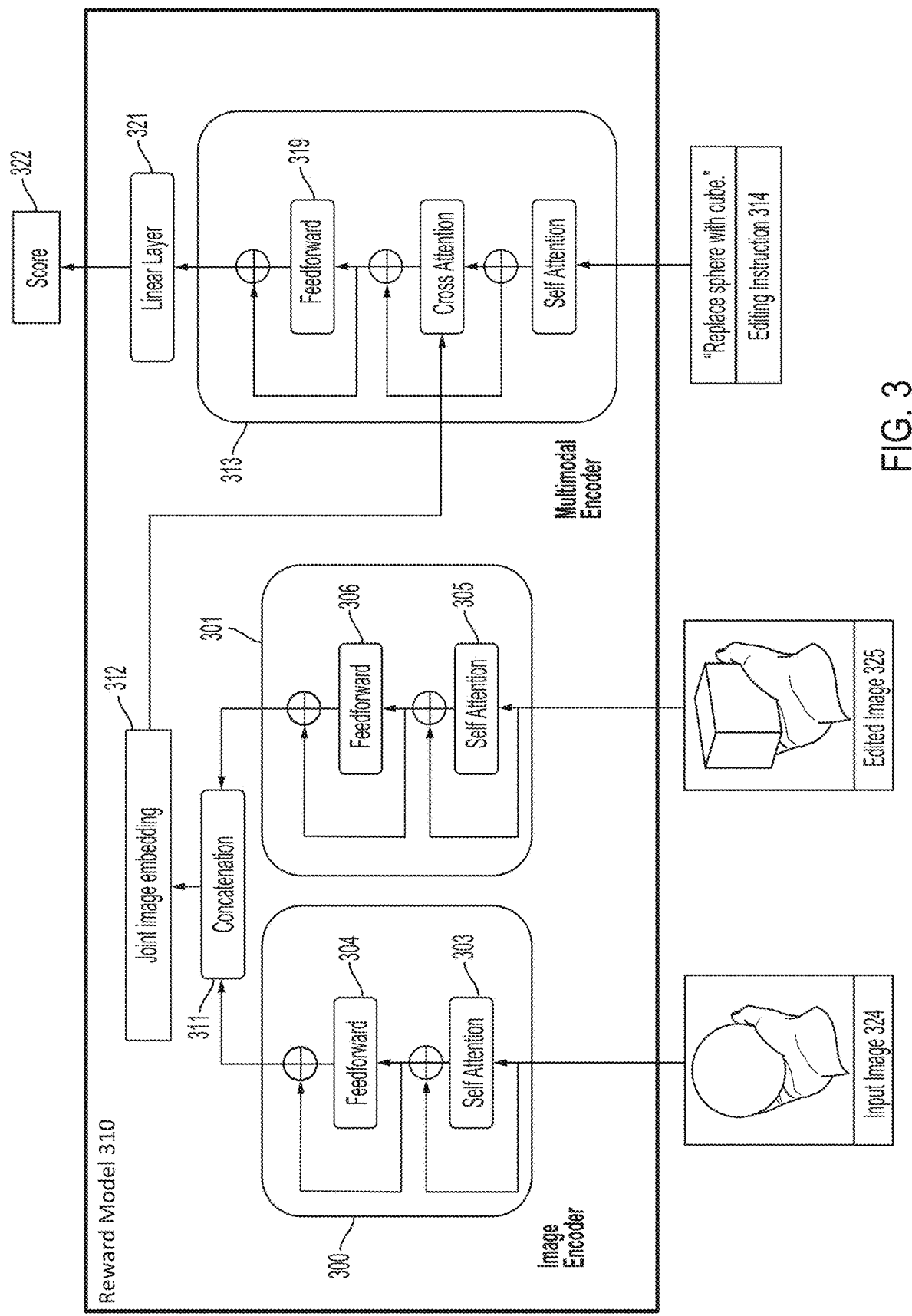
FIG. 3 is a simplified diagram illustrating an example model architecture of the reward model, according to some embodiments.

FIG. 3 is a simplified diagram illustrating an example model architecture of a reward model 310, according to some embodiments. Reward model 310 generates a score 322 which is indicative of the quality of alignment between an input image 324 and a corresponding edited image 325, according to an editing instruction 314. For example, given a triplet of input image 324 illustrating a hand holding a sphere, an edited image 325 of the same hand holding a cube, and an editing instruction 314 of "Replace sphere with cube", reward model 310 may output a score 322 of some value such as 4.5.

Reward model 310 may include image encoders 300 and 301, which encode input image 324 and edited image 325 into respective latent image representations. In some embodiments, image encoder 300 and image encoder 301 may be the same encoder (i.e., have the same parameters), or may be distinct encoders. Image encoder 300 and/or 301 may included self-attention layers 303 and 305 and feedforward layers 304 and 306. The latent image representations of input image 324 and edited image 325 may be concatenated by concatenation 311 to provide a joint image embedding 312.

Reward model 310 may further comprise a multimodal encoder 313 which takes the editing instruction 314 and the joint image embedding 312 as inputs. Multimodal encoder 313 may perform self-attention on editing instruction 314, and cross attention between editing instruction 314 and joint image embedding 312. The resulting representation may be passed through a feedforward network 319. The output of multimodal encoder 313 may be a multimodal embedding of the input image 324, edited image 325, and editing instruction 314. The multimodal embedding may be passed through a linear layer 321 to map it to a scalar value (i.e., score 322). Reward model 310 may be represented as a reward function $\mathcal{R}_\phi(\tilde{x}, c)$, where $\tilde{x}$ represents the edited image, and c represents the condition which includes the original input image and the text instruction. Training of reward model 310 is described in reference to FIG. 4A.

Figure 4A:
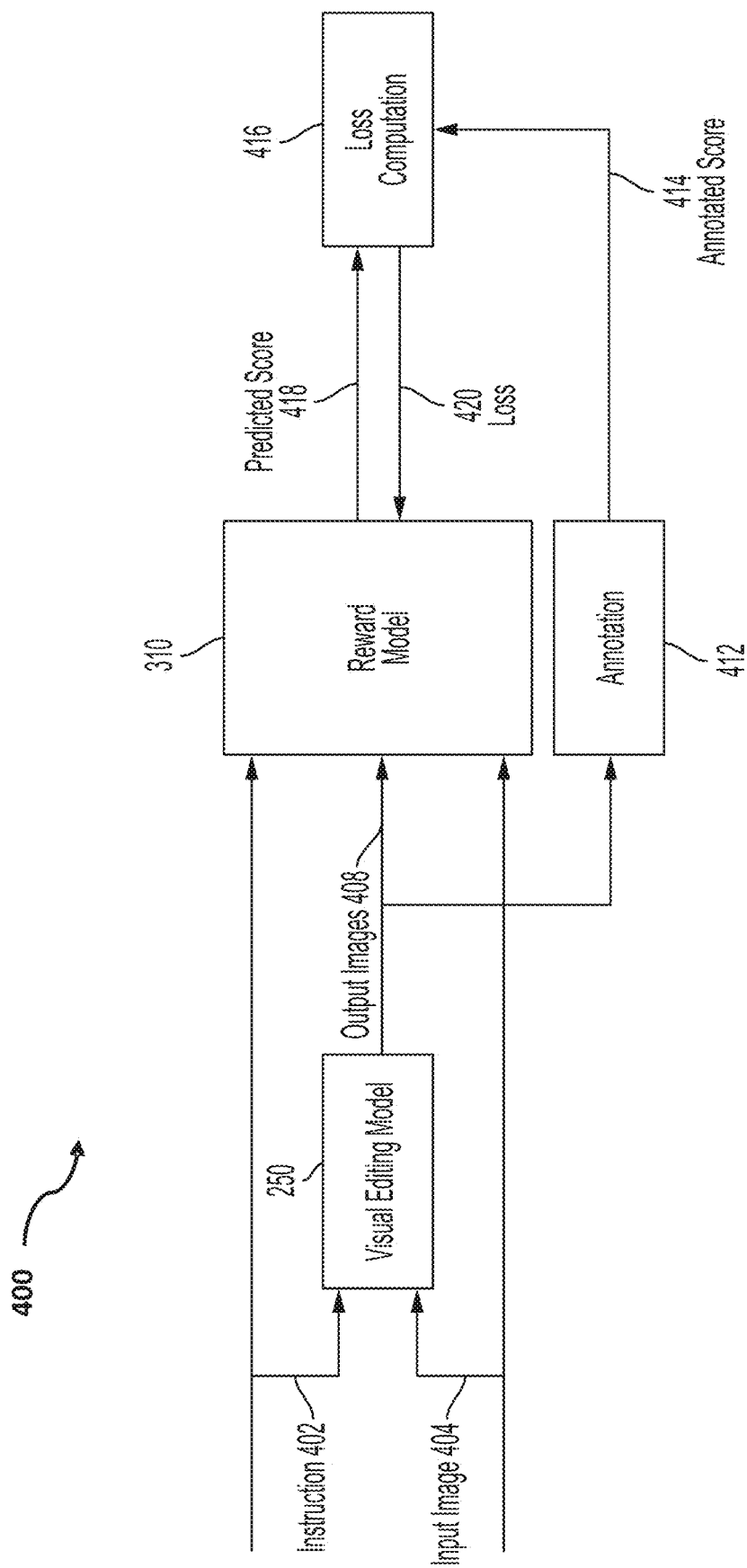
FIG. 4A is a simplified diagram illustrating a reward model training framework according to some embodiments.

FIG. 4A is a simplified diagram illustrating a reward model training framework 400 according to some embodiments. The framework 400 comprises a visual editing model 250 (e.g., as described in FIG. 2), a reward model 310 (e.g., as described in FIG. 3), annotation 412, and loss computation 416. Visual editing model 250 takes an instruction 402 and input image 404 as inputs, and output multiple output image 408. Different output images 408 may be generated by visual editing model 250 by using different initial random seeds, and/or modifying other parameters of visual editing model 250. Output images 408 may be candidate edited images. For example, visual editing model 250 may generate 5 output images 408 based on an input image 404 and instruction 402.

At annotation 412, the framework 400 receives human annotation inputs which indicate the quality of alignment of each of the output images 408. For example, a human annotator may rank each of the output images 408 associated with an input image 404 and instruction 402 from worst to best. This ranking may be converted into a score (e.g., 1 through 5 based on ranking position). Reward model 310 provides a predicted score 418, which is compared with annotated score 414 by loss computation 416. Loss computation 416 thereby computes a loss 420 which may be used to train reward model 310 via backpropagation. In this way the human feedback by annotation 412 is learned by reward model 310, so that it may more accurately predict the alignment quality of an input triplet of instruction 402, input image 404, and output image 408. In some embodiments, output images 408 are received as part of the same training dataset as input image 404 and instruction 402, rather than generated by visual editing model 250.

The training of reward model 310 may be represented as training the reward function $\mathcal{R}_\phi(\tilde{x}, c)$ where $\mathcal{R}$ is the reward model 310 parameterized by $\phi$, $\tilde{x}$ represents the edited image (e.g., output image 408), and c is a pair $[c_I, c_E]$ where $c_I$ represents the original input image (or input image 404 (or input image latent representation) and $c_E$ represents the text instruction 402. For each input image $c_I$ and instruction $c_E$ pair, there are K edited images $\{\tilde{x}\}_{k=1}^K$ ranked by human annotators. Human preference of edited image $\tilde{x}_i$ over $\tilde{x}_j$ may be denoted by $\tilde{x}_i > \tilde{x}_j$. Each pairing of images from the group of K edited images may be used to generate a pairwise loss (e.g., loss computation 416):

$$\ell_{RM}(\phi) := -\Sigma_{\tilde{x}_i > \tilde{x}_j} \log\left[\frac{\exp(\mathcal{R}_\phi(\tilde{x}_i, c))}{\Sigma_{k=i,j} \exp \mathcal{R}_\phi(\tilde{x}_k, c)}\right] \quad (1)$$

where $(i, j) \in [\ldots K]$ and this provides $\binom{K}{2}$ pairs of comparison for each condition c. All the $\binom{K}{2}$ pairs for each condition c may be used in a single batch to learn the reward function.

Figure 4B:
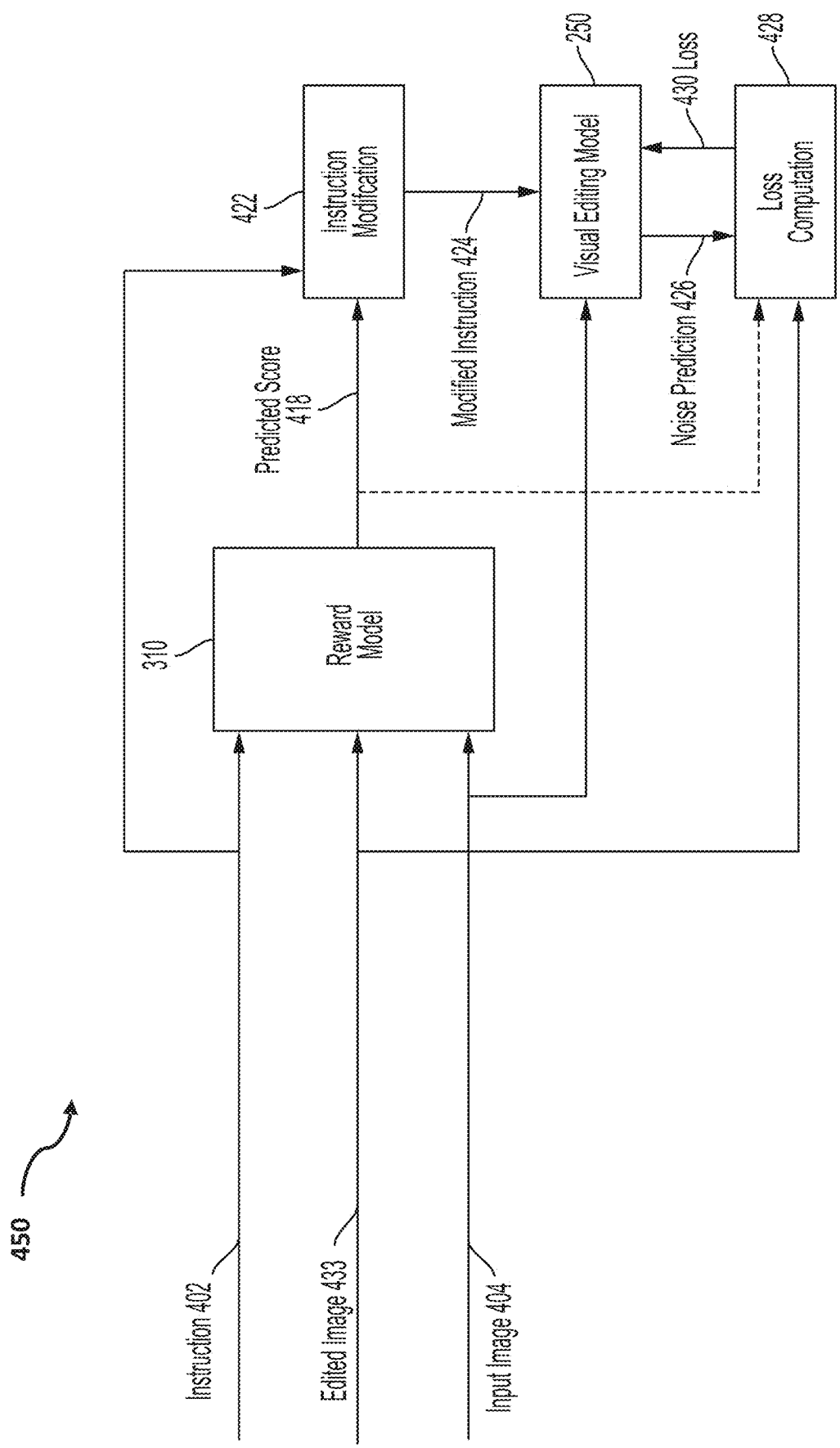
FIG. 4B is a simplified diagram illustrating an instructional visual editing model training framework according to some embodiments.

FIG. 4B is a simplified diagram illustrating an instructional visual editing model training framework 450 according to some embodiments. The framework 450 comprises a visual editing model 250 (e.g., as described in FIG. 2), a trained reward model 310 (e.g., as described in FIG. 3, and trained as described in FIG. 4A), and loss computation 428. Trained reward model 310 generates a predicted score 418 of the triplet of input image 404, instruction 402, and edited image 433. Edited image 433 may be generated by visual editing model 250 based on instruction 402 and input image 404. In some embodiments, edited image 433, when generated by visual editing model 250, remains fixed as visual editing model 250 is trained.

Predicted score 418 may be used to train visual editing model 250 in a number of ways. In some embodiments, predicted score 418 is used by instruction modification 422 to modify instruction 402. For example, an instruction of "Replace sphere with cube" may be modified to generate modified instruction 424 which may read "Replace sphere with cube, the image quality is four out of five." In other embodiments, the predicted score 418 may be used as an additional condition separate from instruction 402 for visual editing model 250.

Visual editing model 250 may use the modified instruction 424 (or instruction 402 and predicted score 418) with original input image 404 as conditions to generate and output image. The predicted score 418 may be modified prior to being used as a condition for visual editing model 250. For example, reward scores may be quantized into five categories, based on the quantile of the empirical reward distribution of the training dataset. Those in the bottom 20%, for example, may be assigned a reward score of one, the next 20% a reward score of 2, and so on. The condition used by visual editing model 250 as modified by the predicted score 418 may be represented as $\tilde{c}=[c_I, c_E, c_R]$ where $c_I$ represents the original input image 404 (or input image latent representation), $c_E$ represents the text instruction 402, and $c_R$ represents the reward score, or text which states the reward score such as "the image quality is four out of five."

Loss computation 428 may be performed based on noise prediction 426 of visual editing model 250. As discussed in FIG. 1, training of a diffusion-based model may be performed based on the predicted noise generated at each iteration of the denoising model, with reference to a noise added to an input image. In this case, edited image 433 may have noise incrementally added as described in FIG. 1, and that noise may be compared with the noise prediction 426 which are the noise predictions for each iteration of a denoising model 212 internal to visual editing model 250. Loss computation 428 may be represented as a condition reward loss:

$$\ell_{CR}(\theta) := \mathbb{E}_{\varepsilon(x),\tilde{x},\epsilon \sim \mathcal{N}(0,1),t}\left[\|\epsilon - \epsilon_\theta(z_t, t, \tilde{c})\|_2^2\right] \quad (2)$$

where $\epsilon$ is the noise associated with edited image 433, $\epsilon_\theta$ is noise prediction 426, $z_t$ is the latent image representation for the current iteration, t is a time condition which tracks the current iteration, and $\tilde{c}$ is the modified condition as described above. Loss computation 428 may compute loss 430 based on the condition reward loss which is used to train visual editing model 250 via backpropagation.

In other embodiments, rather than modify or add a condition, predicted score 418 is used to provide a weight to the loss 430. For example, a weighted reward loss may be represented as:

$$\ell_{WR}(\theta) := \mathbb{E}_{\varepsilon(x),c,\epsilon \sim \mathcal{N}(0,1),t}\left[\omega(\tilde{x}, c) \cdot \|\epsilon - \epsilon_\theta(z_t, t, c)\|_2^2\right] \quad (3)$$

where $\epsilon$ is the noise associated with edited image 433, $\epsilon_\theta$ is noise prediction 426, $z_t$ is the latent image representation for the current iteration, t is a time condition which tracks the current iteration, and c is the condition which includes instruction 402 and input image 404. The weight $\omega(\tilde{x}, c)$ is defined as $\exp(\mathcal{R}_\phi(\tilde{x}, c)/\eta)$ which is an exponential reward weight which is the predicted score 418 based on edited image $\tilde{x}$ and condition c.

Loss computation 428 may compute loss 430 based on the weighted reward loss which is used to train visual editing model 250 via backpropagation. In this way, those images with a higher reward (indicating a higher human preference as predicted by reward model 310) contribute more to the training of visual editing model 250.

Computer and Network Environment

Figure 5A:
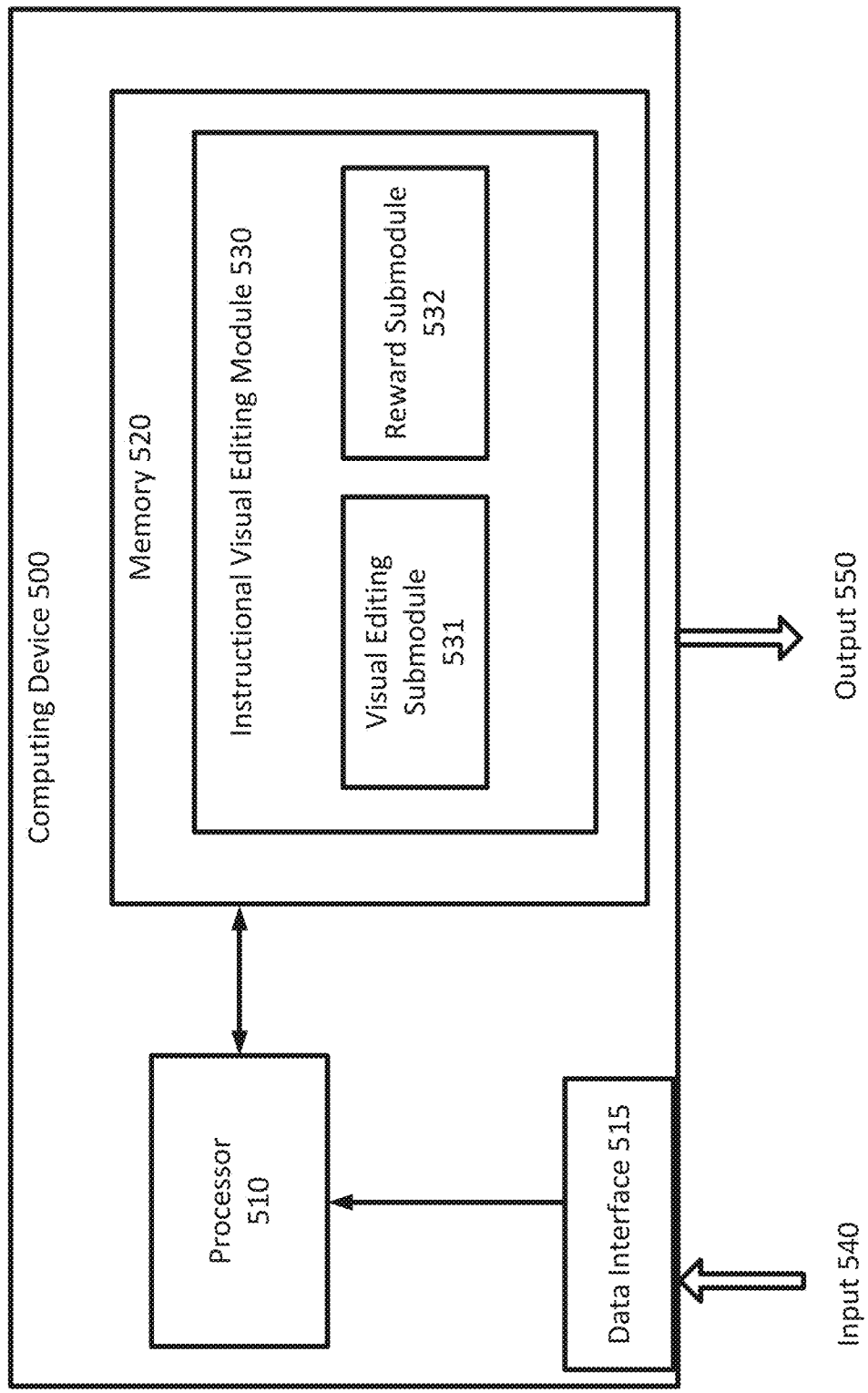
FIG. 5A is a simplified diagram illustrating a computing device implementing the instructional visual editing frameworks described in FIGS. 1-4, according to some embodiments.

FIG. 5A is a simplified diagram illustrating a computing device implementing the instructional visual editing frameworks described in FIGS. 1-4, according to one embodiment described herein. As shown in FIG. 5A, computing device 500 includes a processor 510 coupled to memory 520. Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

In some examples, memory 520 may include non-transitory, tangible, machine readable media that includes executable code that when run by one or more processors (e.g., processor 510) may cause the one or more processors to perform the methods described in further detail herein. For example, as shown, memory 520 includes instructions for instructional visual editing module 530 that may be used to implement and/or emulate the systems and models, and/or to implement any of the methods described further herein, instructional visual editing module 530 may receive input 540 such as an input training data (e.g., images, editing instructions, and/or edited images) via the data interface 515 and generate an output 550 which may be edited images.

The data interface 515 may comprise a communication interface, a user interface (such as a voice input interface, a graphical user interface, and/or the like). For example, the computing device 500 may receive the input 540 (such as a training dataset) from a networked database via a communication interface. Or the computing device 500 may receive the input 540, such as input images and/or editing instructions, from a user via the user interface.

In some embodiments, the instructional visual editing module 530 is configured to train an instructional visual editing model and/or utilize the instructional visual editing model in generating edited images based on an instruction. The instructional visual editing module 530 may further include visual editing submodule 531 which is configured to train a visual editing model (e.g., visual editing model 250) as described in framework 450 in FIG. 4B and/or utilize a visual editing model at inference in generating edited images. The instructional visual editing module 530 may further include reward submodule 532 which is configured to train a reward model (e.g., reward model 310) as described in framework 400 in FIG. 4A and/or provide the reward model to visual editing submodule 531 for use in training the visual editing model.

Some examples of computing devices, such as computing device 500 may include non-transitory, tangible, machine readable media that include executable code that when run by one or more processors (e.g., processor 510) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 5B:
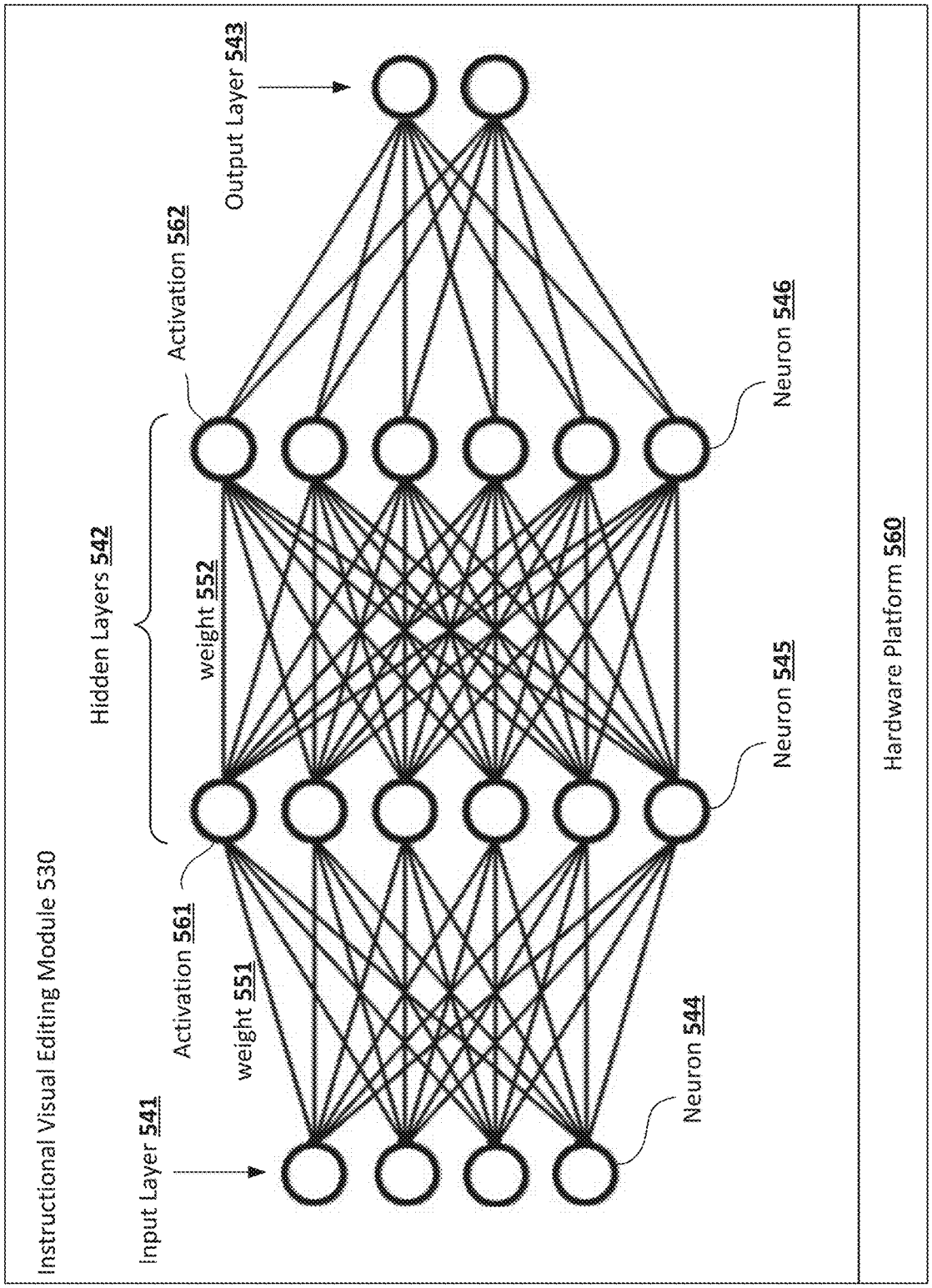
FIG. 5B is a simplified diagram illustrating a neural network structure, according to some embodiments.

FIG. 5B is a simplified diagram illustrating the neural network structure implementing the instructional visual editing module 530 described in FIG. 5A, according to some embodiments. In some embodiments, the instructional visual editing module 530 and/or one or more of its submodules 531-532 may be implemented at least partially via an artificial neural network structure shown in FIG. 5B. The neural network comprises a computing system that is built on a collection of connected units or nodes, referred to as neurons (e.g., 544, 545, 546). Neurons are often connected by edges, and an adjustable weight (e.g., 551, 552) is often associated with the edge. The neurons are often aggregated into layers such that different layers may perform different transformations on the respective input and output transformed input data onto the next layer.

For example, the neural network architecture may comprise an input layer 541, one or more hidden layers 542 and an output layer 543. Each layer may comprise a plurality of neurons, and neurons between layers are interconnected according to a specific topology of the neural network topology. The input layer 541 receives the input data (e.g., 540 in FIG. 5A), such as an input image. The number of nodes (neurons) in the input layer 541 may be determined by the dimensionality of the input data (e.g., the length of a vector of an input image representation). Each node in the input layer represents a feature or attribute of the input.

The hidden layers 542 are intermediate layers between the input and output layers of a neural network. It is noted that two hidden layers 542 are shown in FIG. 5B for illustrative purpose only, and any number of hidden layers may be utilized in a neural network structure. Hidden layers 542 may extract and transform the input data through a series of weighted computations and activation functions.

For example, as discussed in FIG. 5A, the instructional visual editing module 530 receives an input 540 of input images and instructions and transforms the input into an output 550 of edited images. To perform the transformation, each neuron receives input signals, performs a weighted sum of the inputs according to weights assigned to each connection (e.g., 551, 552), and then applies an activation function (e.g., 561, 562, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 541 is transformed into rather different values indicative data characteristics corresponding to a task that the neural network structure has been designed to perform.

The output layer 543 is the final layer of the neural network structure. It produces the network's output or prediction based on the computations performed in the preceding layers (e.g., 541, 542). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the instructional visual editing module 530 and/or one or more of its submodules 531-532 may comprise the transformative neural network structure of layers of neurons, and weights and activation functions describing the non-linear transformation at each neuron. Such a neural network structure is often implemented on one or more hardware processors 510, such as a graphics processing unit (GPU). An example neural network may be those used in visual editing model 250 and/or reward model 310, and/or the like.

In one embodiment, the instructional visual editing module 530 and its submodules 531-532 may be implemented by hardware, software and/or a combination thereof. For example, the instructional visual editing module 530 and its submodules 531-532 may comprise a specific neural network structure implemented and run on various hardware platforms 560, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 560 used to implement the neural network structure is specifically configured based on factors such as the complexity of the neural network, the scale of the tasks (e.g., training time, input data scale, size of training dataset, etc.), and the desired performance.

In one embodiment, the neural network based instructional visual editing module 530 and one or more of its submodules 531-532 may be trained by iteratively updating the underlying parameters (e.g., weights 551, 552, etc., bias parameters and/or coefficients in the activation functions 561, 562 associated with neurons) of the neural network based on the loss described in Eq. (1), Eq. (2), or Eq. (3). For example, during forward propagation, the training data such as input images and instructions are fed into the neural network. The data flows through the network's layers 541, 542, with each layer performing computations based on its weights, biases, and activation functions until the output layer 543 produces the network's output 550. In some embodiments, output layer 543 produces an intermediate output on which the network's output 550 is based.

The output generated by the output layer 543 is compared to the expected output (e.g., a "ground-truth" such as the corresponding noise distribution) from the training data, to compute a loss function that measures the discrepancy between the predicted output and the expected output. For example, the loss function may be according to Eq. (1), Eq. (2), or Eq. (3). Given the loss, the negative gradient of the loss function is computed with respect to each weight of each layer individually. Such negative gradient is computed one layer at a time, iteratively backward from the last layer 543 to the input layer 541 of the neural network. These gradients quantify the sensitivity of the network's output to changes in the parameters. The chain rule of calculus is applied to efficiently calculate these gradients by propagating the gradients backward from the output layer 543 to the input layer 541.

Parameters of the neural network are updated backwardly from the last layer to the input layer (backpropagating) based on the computed negative gradient using an optimization algorithm to minimize the loss. The backpropagation from the last layer 543 to the input layer 541 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as unseen input images and instructions.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

Therefore, the training process transforms the neural network into an "updated" trained neural network with updated parameters such as weights, activation functions, and biases. The trained neural network thus improves neural network technology in image generation.

Figure 6:
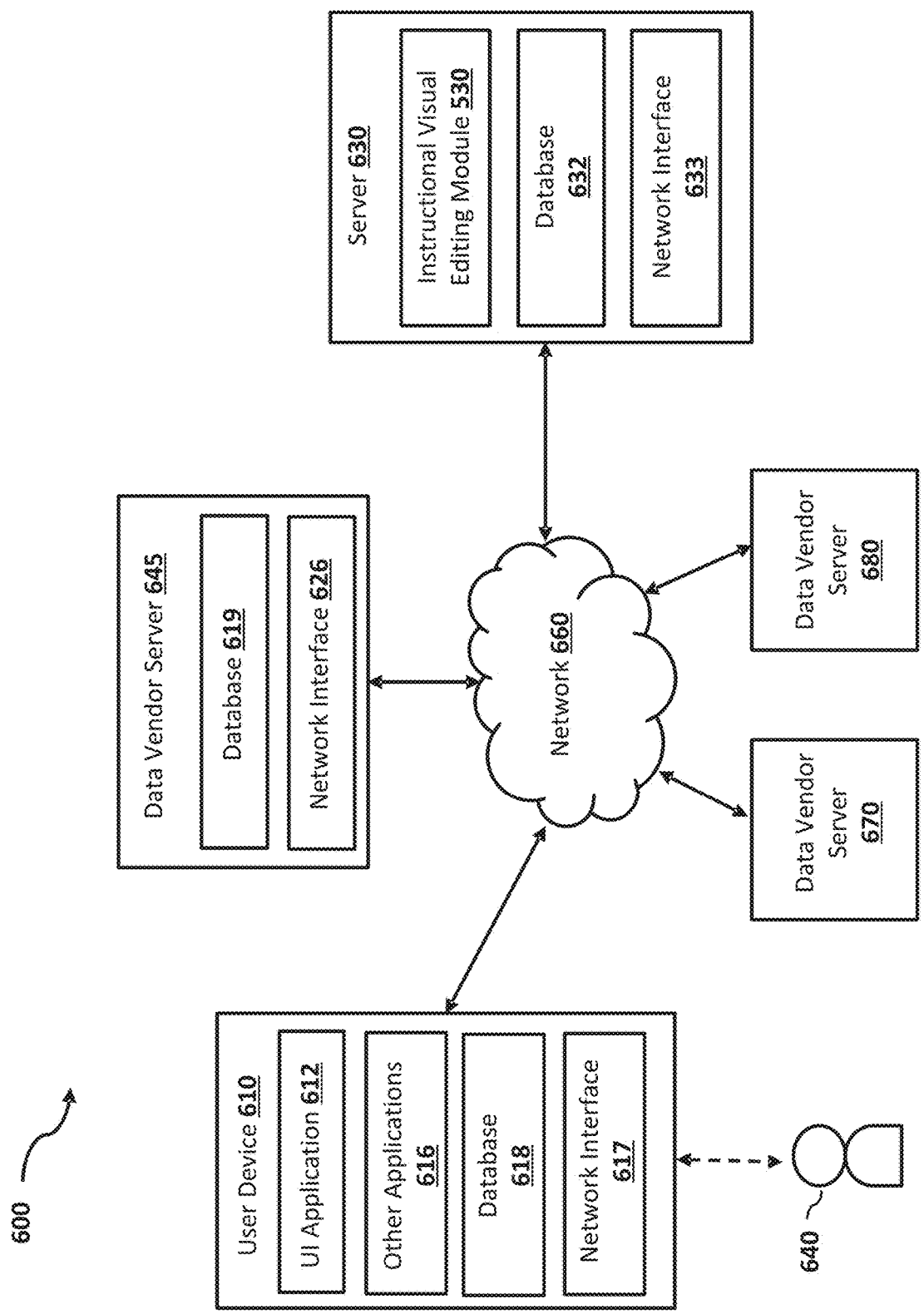
FIG. 6 is a simplified block diagram of a networked system suitable for implementing the instructional visual editing frameworks described in FIGS. 1-5B and other embodiments described herein.

FIG. 6 is a simplified block diagram of a networked system 600 suitable for implementing the frameworks described in FIGS. 1-5B and other embodiments described herein. In one embodiment, system 600 includes the user device 610 which may be operated by user 640, data vendor servers 645, 670 and 680, server 630, and other forms of devices, servers, and/or software components that operate to perform various methodologies in accordance with the described embodiments. Exemplary devices and servers may include device, stand-alone, and enterprise-class servers which may be similar to the computing device 500 described in FIG. 5A, operating an OS such as a MICROSOFT® OS, a UNIX® OS, a LINUX® OS, or other suitable device and/or server-based OS. It can be appreciated that the devices and/or servers illustrated in FIG. 6 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 610, data vendor servers 645, 670 and 680, and the server 630 may communicate with each other over a network 660. User device 610 may be utilized by a user 640 (e.g., a driver, a system admin, etc.) to access the various features available for user device 610, which may include processes and/or applications associated with the server 630 to receive an output data anomaly report.

User device 610, data vendor server 645, and the server 630 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660.

User device 610 may be implemented as a communication device that may utilize appropriate hardware and software configured for wired and/or wireless communication with data vendor server 645 and/or the server 630. For example, in one embodiment, user device 610 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 610 of FIG. 6 contains a user interface (UI) application 612, and/or other applications 616, which may correspond to executable processes, procedures, and/or applications with associated hardware. For example, the user device 610 may receive a message indicating an edited image from the server 630 and display the message via the UI application 612. In other embodiments, user device 610 may include additional or different modules having specialized hardware and/or software as required.

In various embodiments, user device 610 includes other applications 616 as may be desired in particular embodiments to provide features to user device 610. For example, other applications 616 may include security applications for implementing client-side security features, programmatic client applications for interfacing with appropriate application programming interfaces (APIs) over network 660, or other types of applications. Other applications 616 may also include communication applications, such as email, texting, voice, social networking, and IM applications that allow a user to send and receive emails, calls, texts, and other notifications through network 660. For example, the other application 616 may be an email or instant messaging application that receives a prediction result message from the server 630. Other applications 616 may include device interfaces and other display modules that may receive input and/or output information. For example, other applications 616 may contain software programs for asset management, executable by a processor, including a graphical user interface (GUI) configured to provide an interface to the user 640 to view images.

User device 610 may further include database 618 stored in a transitory and/or non-transitory memory of user device 610, which may store various applications and data and be utilized during execution of various modules of user device 610. Database 618 may store user profile relating to the user 640, predictions previously viewed or saved by the user 640, historical data received from the server 630, and/or the like. In some embodiments, database 618 may be local to user device 610. However, in other embodiments, database 618 may be external to user device 610 and accessible by user device 610, including cloud storage systems and/or databases that are accessible over network 660.

User device 610 includes at least one network interface component 617 adapted to communicate with data vendor server 645 and/or the server 630. In various embodiments, network interface component 617 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 645 may correspond to a server that hosts database 619 to provide training datasets including input images, instructions, and edited images to the server 630. The database 619 may be implemented by one or more relational database, distributed databases, cloud databases, and/or the like.

The data vendor server 645 includes at least one network interface component 626 adapted to communicate with user device 610 and/or the server 630. In various embodiments, network interface component 626 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 645 may send asset information from the database 619, via the network interface 626, to the server 630.

The server 630 may be housed with the instructional visual editing module 530 and its submodules described in FIG. 5A. In some implementations, instructional visual editing module 530 may receive data from database 619 at the data vendor server 645 via the network 660 to generate edited images. The generated images may also be sent to the user device 610 for review by the user 640 via the network 660.

The database 632 may be stored in a transitory and/or non-transitory memory of the server 630. In one implementation, the database 632 may store data obtained from the data vendor server 645. In one implementation, the database 632 may store parameters of the instructional visual editing module 530. In one implementation, the database 632 may store previously generated images, and the corresponding input feature vectors.

In some embodiments, database 632 may be local to the server 630. However, in other embodiments, database 632 may be external to the server 630 and accessible by the server 630, including cloud storage systems and/or databases that are accessible over network 660.

The server 630 includes at least one network interface component 633 adapted to communicate with user device 610 and/or data vendor servers 645, 670 or 680 over network 660. In various embodiments, network interface component 633 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 660 may be implemented as a single network or a combination of multiple networks. For example, in various embodiments, network 660 may include the Internet or one or more intranets, landline networks, wireless networks, and/or other appropriate types of networks. Thus, network 660 may correspond to small scale communication networks, such as a private or local area network, or a larger scale network, such as a wide area network or the Internet, accessible by the various components of system 600.

Example Work Flows

Figure 7:
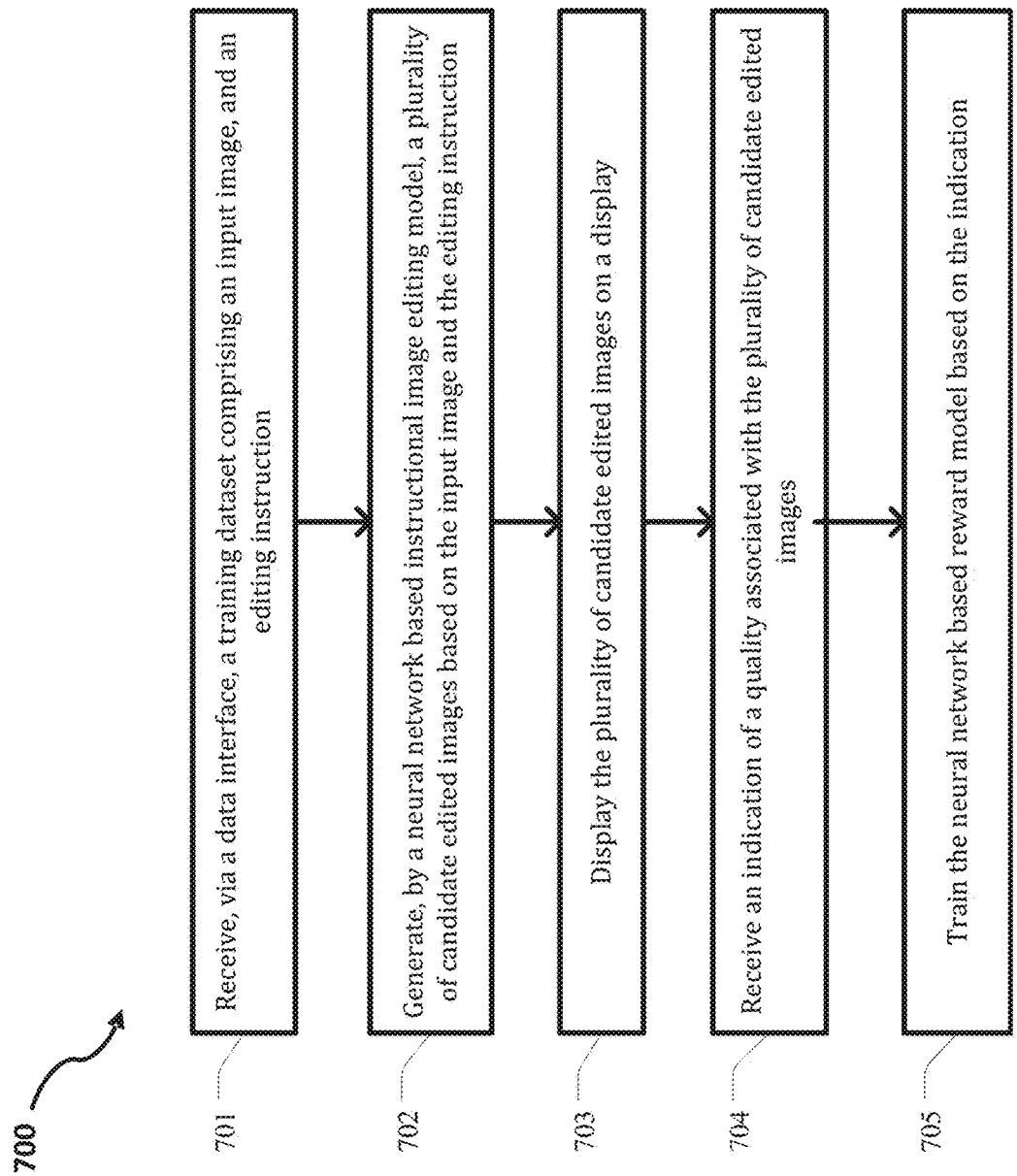
FIG. 7 is an example logic flow diagram illustrating a method of training a reward model, according to some embodiments.

FIG. 7 is an example logic flow diagram illustrating a method of training a reward model (e.g., reward model 310) based on the framework shown in FIG. 4A, according to some embodiments. One or more of the processes of method 700 may be implemented, at least in part, in the form of executable code stored on non-transitory, tangible, machine-readable media that when run by one or more processors may cause the one or more processors to perform one or more of the processes. In some embodiments, method 700 corresponds to the operation of the instructional visual editing module 530 (e.g., FIGS. 5A and 6) that performs the training of the reward model.

As illustrated, the method 700 includes a number of enumerated steps, but aspects of the method 700 may include additional steps before, after, and in between the enumerated steps. In some aspects, one or more of the enumerated steps may be omitted or performed in a different order.

At step 701, a system (e.g., computing device 500 in FIG. 5A or server 630 in FIG. 6) receives, via a data interface (e.g., data interface 515 in FIG. 5A or network interface 633 in FIG. 6), a training dataset comprising an input image, and an editing instruction. The training dataset may include a large number of input images and associated editing instructions. These may be general images gathered from a variety of sources, or may be domain-specific (e.g., images of animals).

At step 702, the system generates, by a neural network based instructional image editing model (e.g., visual editing model 250), a plurality of candidate edited images based on the input image and the editing instruction. The plurality of images may be generated, for example, by using different starting random seed inputs, modifying parameters of the model, or other methods in order to produce a variety of candidate images.

At step 703, the system displays the plurality of candidate edited images on a display (e.g., on user device 610).

At step 704, the system receives an indication of a quality associated with the plurality of candidate edited images. The quality may be, for example, an alignment between the input image and the edited image according to the editing instruction. In some embodiments, the indication is in the form of a ranking of the candidate edited images from worst to best. The indication may be input by a user (e.g., user 640) by an user interface device associated with the display.

At step 705, the system trains the neural network based reward model based on the indication. Training may include inputting pairs of input images, editing instructions, and candidate edited images to the reward model, and comparing the output of the reward model with a value derived from the indication of the quality of the inputs. For example, the reward value may be a value based on a ranking indication (e.g., a value of 1 through 5 for a ranking of 5 images). A loss objective may be computed which is based on this comparison, and parameters of the reward model may be updated in order to minimize the loss objective. This updating may be performed iteratively such that gradient descent occurs, and parameters may be updated via backpropagation. Certain portions of the reward model may be frozen, while others may have their parameters updated. For example, an image encoder of the reward model may have its parameters frozen, and only an output layer of group of layers may be updated. In other embodiments, the full model may be trained jointly.

The trained reward model may be used in a variety of ways. It may be used as an automated way of indicating the quality of a triplet of input image, editing instruction, and edited image. The trained reward model may be used as a benchmark to validate the quality of an image editing model. It may also be used in fine-tuning an image editing model, as described in FIG. 8. The reward model may be used to replace a human annotator in creating a dataset which includes input images, output images, editing instructions, and a quality score associated with each triplet.

Figure 8:
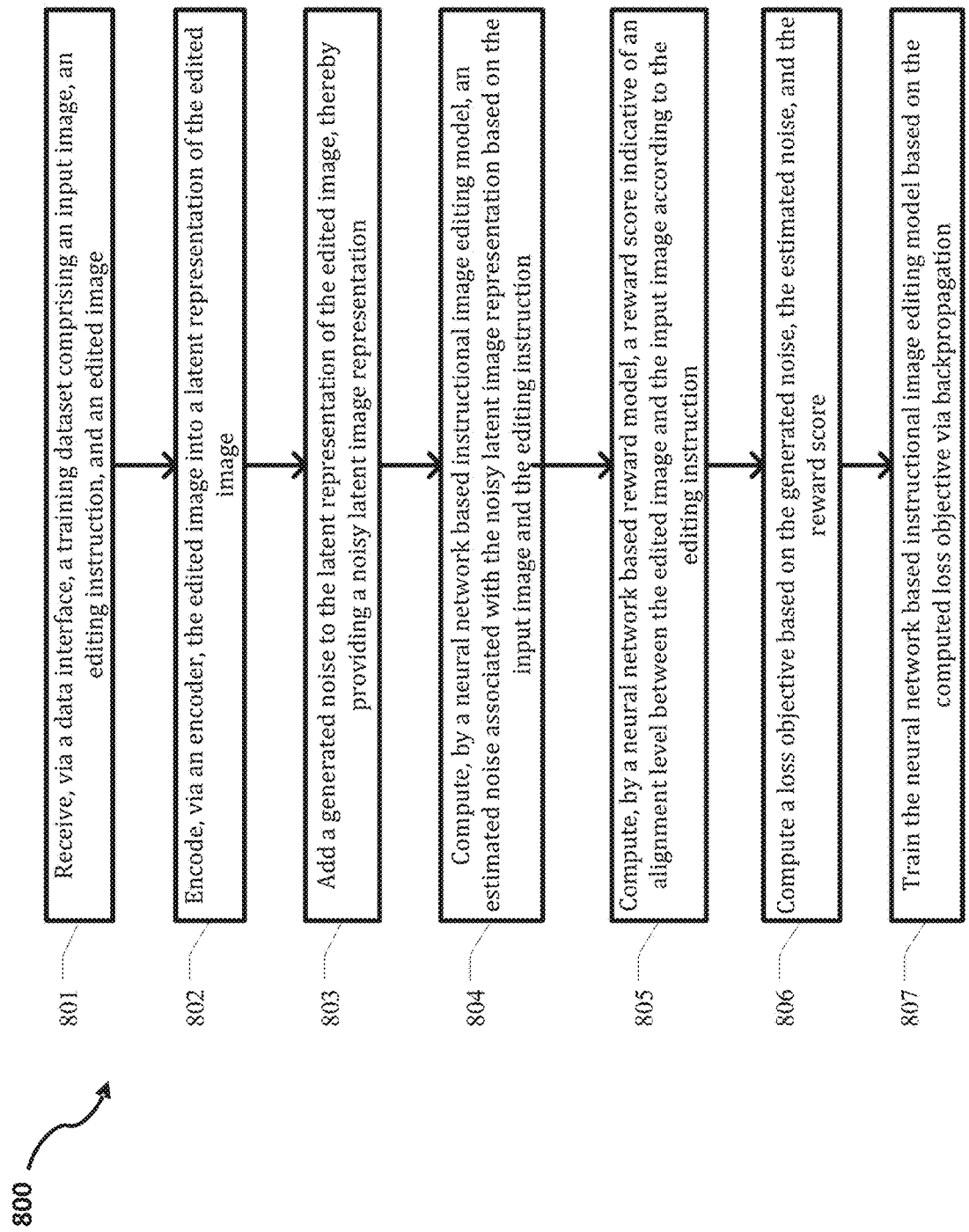
FIG. 8 is an example logic flow diagram illustrating a method of training an instructional visual editing model, according to some embodiments.

FIG. 8 is an example logic flow diagram illustrating a method of training an instructional visual editing model based on the framework shown in FIG. 4B, according to some embodiments. One or more of the processes of method 800 may be implemented, at least in part, in the form of executable code stored on non-transitory, tangible, machine-readable media that when run by one or more processors may cause the one or more processors to perform one or more of the processes. In some embodiments, method 800 corresponds to the operation of the instructional visual editing module 530 (e.g., FIGS. 5A and 6) that performs the training of the instructional visual editing model.

As illustrated, the method 800 includes a number of enumerated steps, but aspects of the method 800 may include additional steps before, after, and in between the enumerated steps. In some aspects, one or more of the enumerated steps may be omitted or performed in a different order.

At step 801, a system (e.g., computing device 500 in FIG. 5A or server 630 in FIG. 6) receives, via a data interface (e.g., data interface 515 in FIG. 5A or network interface 633 in FIG. 6), a training dataset comprising an input image, an editing instruction, and an edited image. The training dataset may include a large number of input images and associated editing instructions. These may be general images gathered from a variety of sources, or may be domain-specific (e.g., images of animals). The training dataset for training the instructional visual editing model may be the same dataset or a different dataset than the one used in training the reward model.

At step 802, the system encodes, via an encoder (e.g., encoder 104 in FIG. 1, or image encoder 300 in FIG. 3), the edited image into a latent representation of the edited image. The input image may also be encoded by the same or by a different encoder. In some embodiments, the encoder produces a latent vector representation of the image (e.g., latent vector representation $z_0$ 106*a* in FIG. 1). In other embodiments, the encoding includes a down-scaling of the image pixel data.

At step 803, the system adds a generated noise (e.g., noise $\varepsilon$ 108) to the latent representation of the edited image, thereby providing a noisy latent image representation (e.g., latent representation $z_T$ 106*t*).

At step 804, the system computes, by a neural network based instructional image editing model (e.g., visual editing model 250), an estimated noise associated with the noisy latent image representation based on the input image and the editing instruction. The estimated noise may be in the form of a vector, and/or may represent an estimated noise distribution which may be sampled.

At step 805, the system computes, by a neural network based reward model (e.g., reward model 310), a reward score indicative of an alignment level between the edited image and the input image according to the editing instruction. The reward model may be trained as described in FIG. 7. The reward score output by the reward model may be a non-integer value (e.g., 2.3). Before using the reward score, the system may modify it to be an integer value by scaling and rounding the reward score to a predetermined range of values. In some embodiments, reward scores are stored for a number of input image/instruction/edited image triplets, and each of those reward scores is scaled such that they cover a predetermined range. For example, if a set of reward scores included (1.3, 0.5, 1.6, 0.2, 2.3), those reward scores may be modified to (2, 2, 4, 1, 5). In this way, the reward scores as used in the training cover a predictable repeatable range of values.

At step 806, the system computes a loss objective based on the generated noise, the estimated noise, and the reward score. In some embodiments, the loss objective is a weighted reward loss as described in equation (3). In this case, the loss computed for each input image/instruction/edited image triplet is weighted according to how high of a quality the triplet is in terms of alignment as predicted by the reward model. This allows for high quality triplets to have a larger proportional affect on the training of the instructional image editing model. In other embodiments, the loss objective is a condition reward loss as described in equation (2). In this case each loss is weighted the same, but the reward score is utilized by modifying the editing instruction. For example, an instruction of "replace the sphere with a cube" may be modified to "replace the sphere with a cube, the image quality is three out of five." In this way the model still learns from each training triplet, but with an inherent understanding of the quality of that output. This allows for the instructional image editing model to produce images of a given quality at inference as described below.

At step 807, the system trains the neural network based instructional image editing model based on the computed loss objective via backpropagation. This may include updated all or a subset of parameters included in the instructional image editing model.

The steps described in FIG. 8 may be repeated iteratively to continue to train the instructional image editing model using a number of input images and editing instructions. The training may continue for a predetermined amount of time, or until it is determined that the performance of the model has converged.

A trained instructional image editing model may be used at inference to generate an edited image given an input image and an editing instruction. In some embodiments, the editing instruction may be appended with text that includes a desired reward score. For example, an instruction of "replace the sphere with a cube" may be modified to "replace the sphere with a cube, the image quality is five out of five." At inference the input image may be used as the conditioning image together wither the editing instruction (modified or not) to condition the denoising of a random vector.

Example Results

FIGS. 9-14 represent exemplary test results using embodiments described herein. Experiments were preformed comparing HIVE, HIVE without human feedback (which is trained on an improved dataset), and InstructPix2Pix as described in Brooks et al., Instructpix2pix: Learning to follow image editing instructions, arXiv:2211.09800, 2022. Unless otherwise stated, HIVE was implemented with condition reward loss.

Figure 9:
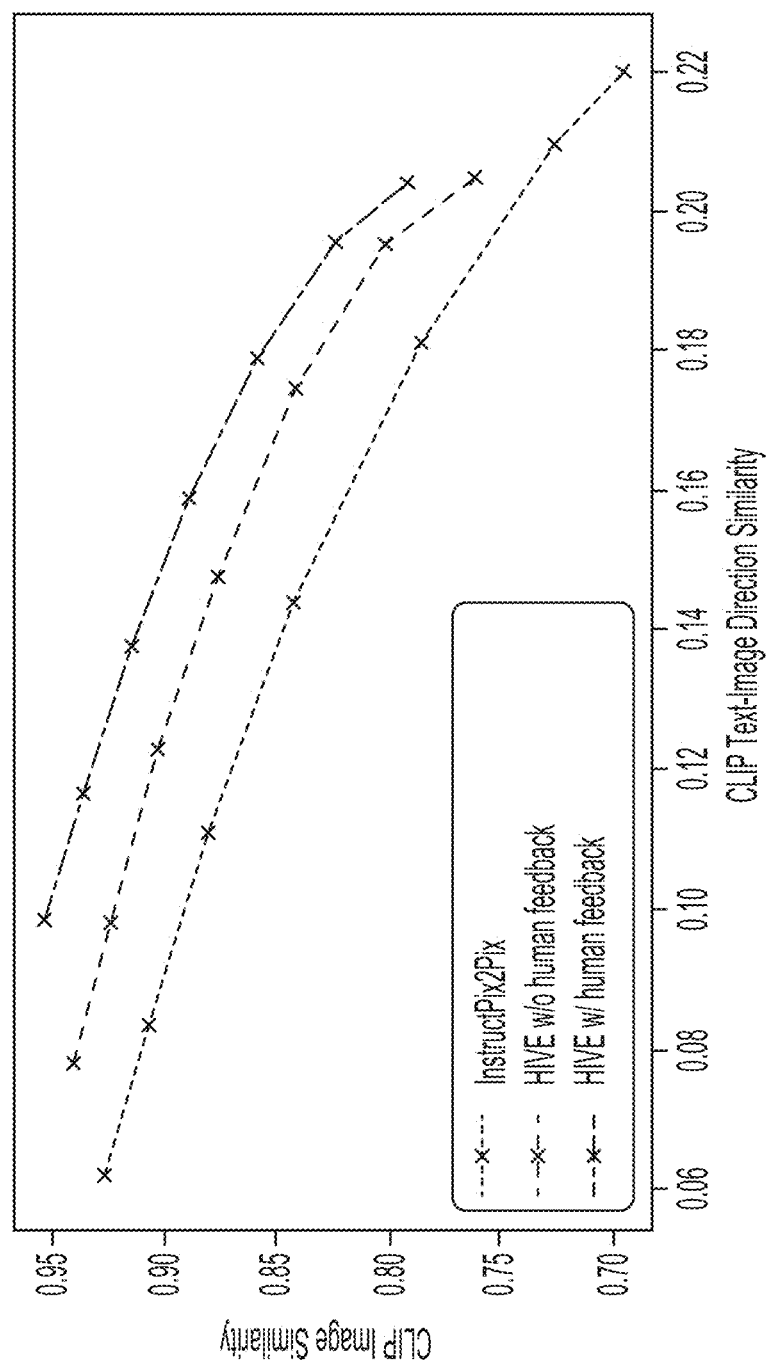
FIG. 9 provides a chart illustrating exemplary performance of embodiments described herein.

FIG. 9 provides a chart illustrating exemplary performance of embodiments described herein. The X-axis here represents consistency of the edited image with the instruction text, and the Y-axis represents consistency of the edited image with the input image. As illustrated, HIVE without human feedback improves notably over InstructPix2Pix. Moreover, human feedback (as captured by the reward model, and fine-tuning of the visual editing model using the reward model) further boosts the performance of HIVE by a large margin.

FIGS. 10A-10B provide charts illustrating exemplary performance of embodiments described herein. FIG. 10A illustrates a user study comparing alignment of images generated by InstructPix2Pix and HIVE without human feedback. HIVE without human feedback obtained 30% more votes than InstructPix2Pix. FIG. 10B illustrates a user study comparing alignment of images generated by HIVE with and without human feedback. HIVE with human feedback obtained 10.8% more votes than without human feedback.

Figure 11:
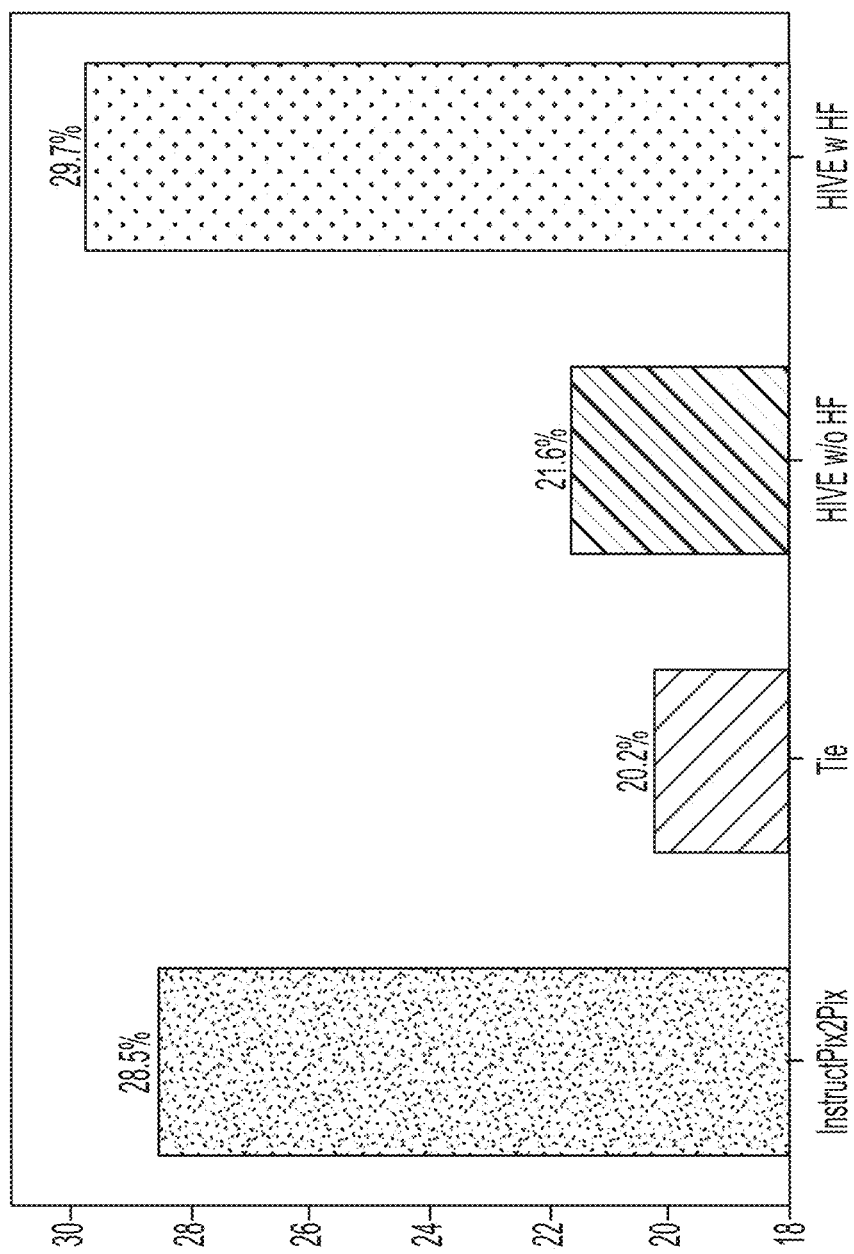
FIG. 11 provides a chart illustrating exemplary performance of embodiments described herein.

FIG. 11 provides a chart illustrating exemplary performance of embodiments described herein. Specifically, FIG. 11 illustrates a user study which compared edited image quality (without regard to alignment) of InstructPix2Pix, and HIVE with and without human feedback. As illustrated, HIVE with human feedback achieved the highest performance.

Figure 12A:
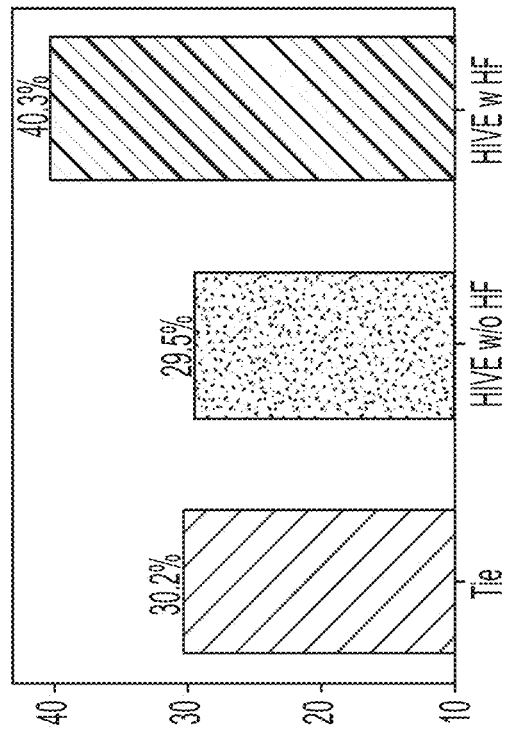
FIGS. 12A-12B provide charts illustrating exemplary performance of embodiments described herein.
Figure 12B:
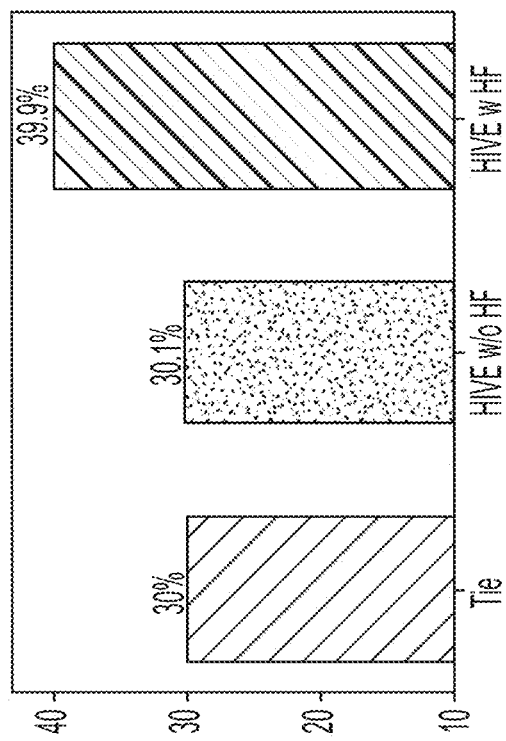

FIGS. 12A-12B provide charts illustrating exemplary performance of embodiments described herein. FIG. 12A illustrates the results of a user study of human preferences of images generated by HIVE with and without feedback, trained using weighted reward loss. FIG. 12B illustrates the results of a user study of human preferences of images generated by HIVE with and without feedback, trained using condition reward loss. As illustrated, the human preferences in each case are very similar.

Figure 13:
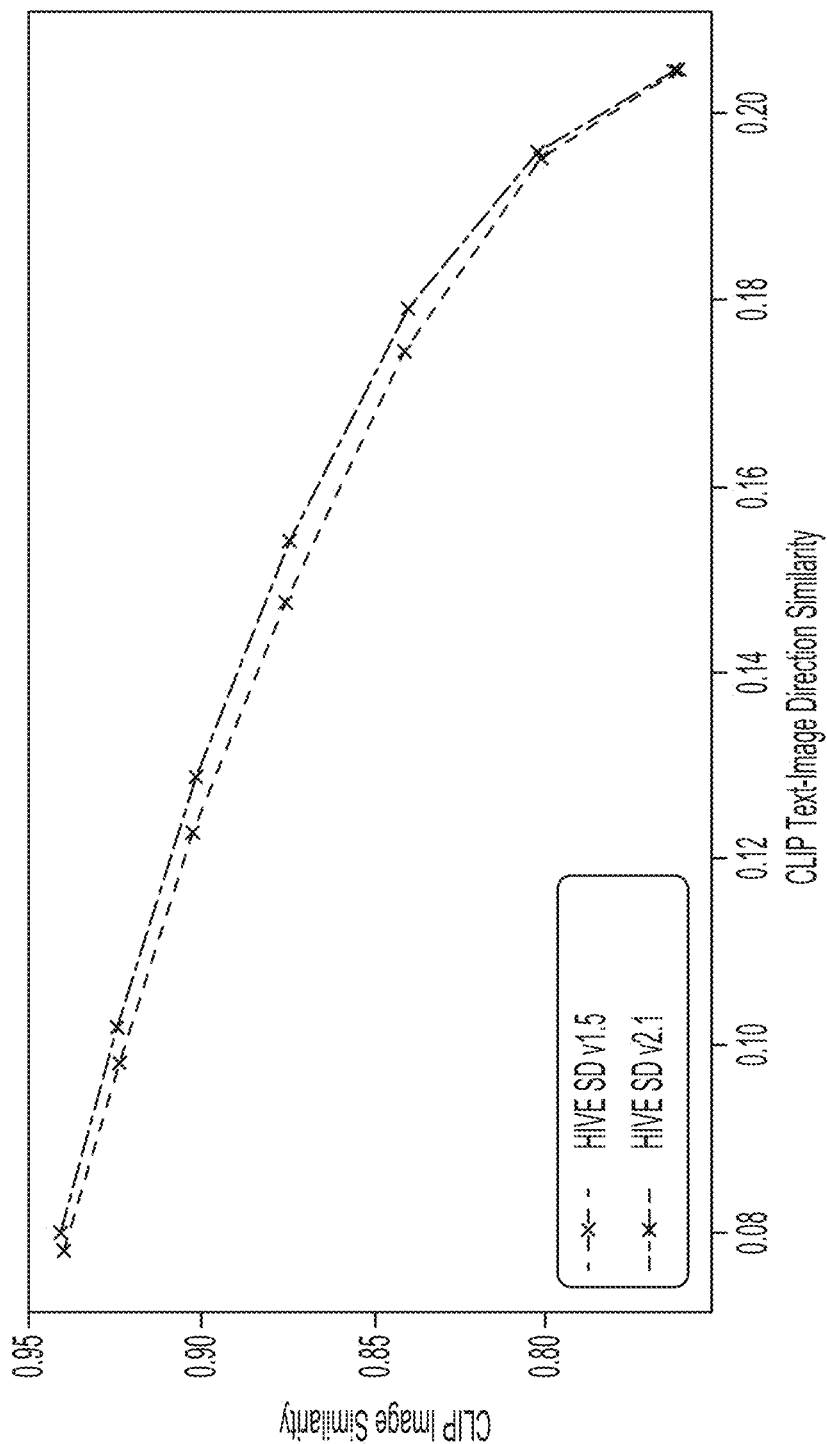
FIG. 13 provides a chart illustrating exemplary performance of embodiments described herein.

FIG. 13 provides a chart illustrating exemplary performance of embodiments described herein. The X-axis here represents consistency of the edited image with the instruction text, and the Y-axis represents consistency of the edited image with the input image. The chart illustrates the performance difference when using different diffusion models as baseline models, with an improvement shown when using an updated version of a Stable Diffusion model.

Figure 14:
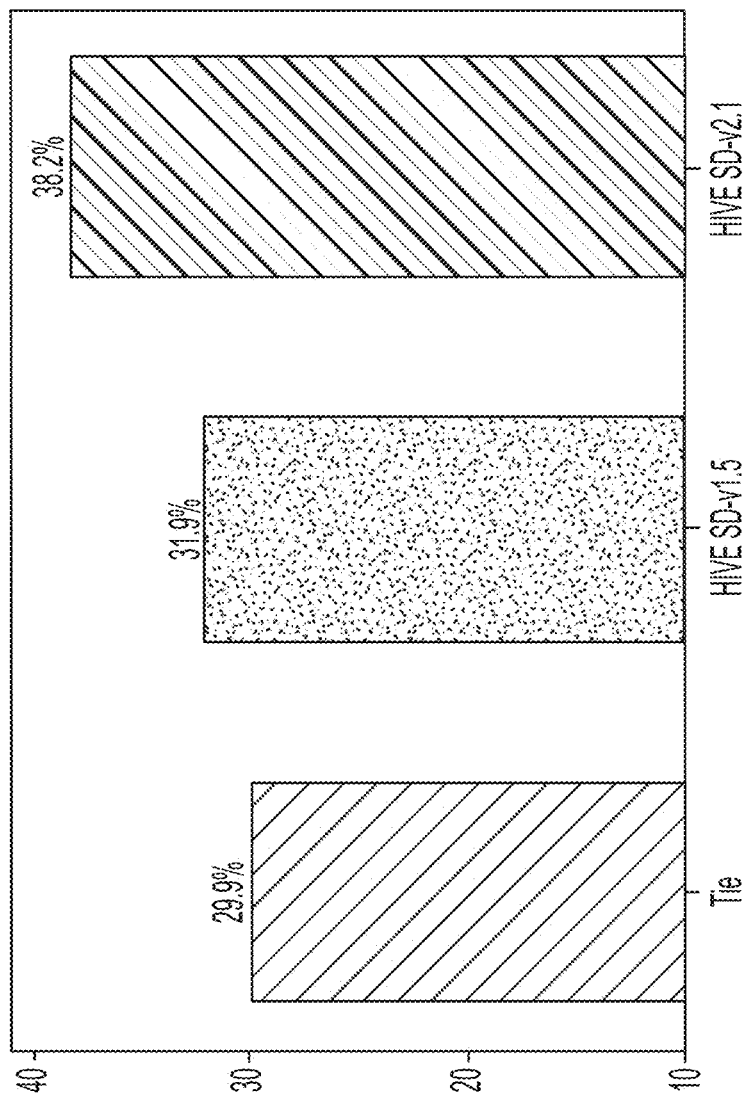
FIG. 14 provides a chart illustrating exemplary performance of embodiments described herein.

FIG. 14 provides a chart illustrating exemplary performance of embodiments described herein. The chart illustrates the user preference difference when using different diffusion models as baseline models, with an improvement shown when using an updated version of a Stable Diffusion model.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of training a neural network based instructional image editing model, the method comprising:
receiving, via a data interface, a training dataset comprising an input image, an editing instruction, and an edited image;
generating a noisy latent image representation of the edited image by gradually adding noise to a latent representation of the edited image;
generating, by the neural network based instructional image editing model, an estimated noise from the noisy latent image representation based on the input image and the editing instruction;
computing, by a neural network based reward model, a reward score indicative of an alignment level between the edited image and the input image according to the editing instruction;
computing a loss objective based on the added noise, the estimated noise, and the reward score; and
training the neural network based instructional image editing model based on the computed loss objective via backpropagation.

2. The method of claim 1, further comprising:
receiving, via the data interface, a second training dataset comprising a second input image, and a second editing instruction;
generating, by the neural network based instructional image editing model, a plurality of candidate edited images based on the second input image and the second editing instruction;
displaying the plurality of candidate edited images on a display;
receiving an indication of a quality associated with the plurality of candidate edited images; and
training the neural network based reward model based on the indication.

3. The method of claim 2, wherein the indication comprises a ranking of the plurality of candidate edited images.

4. The method of claim 1, wherein the neural network based instructional image editing model comprises a series of neural network based denoising models,
wherein each neural network based denoising model generates a respective estimated noise from an input image representations, and
wherein the estimated noise from the noisy latent image representation is one of the respective estimated noise.

5. The method of claim 1, wherein the computing the loss objective comprises weighting the loss objective based on the reward score.

6. The method of claim 1, further comprising:
modifying the editing instruction based on the reward score.

7. The method of claim 6, wherein the modifying comprises appending text to the editing instruction including a value based on the reward score.

8. The method of claim 1, further comprising:
scaling and rounding the reward score to an integer over a predetermined range of values.

9. The method of claim 1, wherein the generating the noisy latent image representation of the edited image comprises:
encoding, via the encoder, the edited image into a latent representation of the edited image; and
adding a generated noise to the latent representation of the edited image.

10. A system for training a neural network based instructional image editing model, the system comprising:
a memory that stores the neural network based instructional image editing model and a plurality of processor-executable instructions;
a communication interface that receives a training dataset comprising an input image, an editing instruction, and an edited image; and
one or more hardware processors that read and execute the plurality of processor-executable instructions from the memory to perform operations comprising:
generating a noisy latent image representation of the edited image by gradually adding noise to a latent representation of the edited image;
generating, by the neural network based instructional image editing model, an estimated noise from the noisy latent image representation based on the input image and the editing instruction;
computing, by a neural network based reward model, a reward score indicative of an alignment level between the edited image and the input image according to the editing instruction;
computing a loss objective based on the added noise, the estimated noise, and the reward score; and
training the neural network based instructional image editing model based on the computed loss objective via backpropagation.

11. The system of claim 10, the operations further comprising:
receiving, via the communication interface, a second training dataset comprising a second input image, and a second editing instruction;
generating, by the neural network based instructional image editing model, a plurality of candidate edited images based on the second input image and the second editing instruction;
displaying the plurality of candidate edited images on a display;
receiving an indication of a quality associated with the plurality of candidate edited images; and
training the neural network based reward model based on the indication.

12. The system of claim 11, wherein the indication comprises a ranking of the plurality of candidate edited images.

13. The system of claim 10, wherein the neural network based instructional image editing model comprises a series of neural network based denoising models,
wherein each neural network based denoising model generates a respective estimated noise from an input image representations, and
wherein the estimated noise from the noisy latent image representation is one of the respective estimated noise.

14. The system of claim 10, wherein the computing the loss objective comprises weighting the loss objective based on the reward score.

15. The system of claim 10, the operations further comprising:
modifying the editing instruction based on the reward score.

16. The system of claim 15, wherein the modifying comprises appending text to the editing instruction including a value based on the reward score.

17. The system of claim 10, the operations further comprising:
scaling and rounding the reward score to an integer over a predetermined range of values.

18. The system of claim 10, wherein the generating the noisy latent image representation of the edited image comprises:

encoding, via the encoder, the edited image into a latent representation of the edited image; and adding a generated noise to the latent representation of the edited image.

19. A non-transitory machine-readable medium comprising a plurality of machine-executable instructions which, when executed by one or more processors, are adapted to cause the one or more processors to perform operations comprising:

receiving, via a data interface, a training dataset comprising an input image, an editing instruction, and an edited image;

generating a noisy latent image representation of the edited image by gradually adding noise to a latent representation of the edited image;

generating, by a neural network based instructional image editing model, an estimated noise from the noisy latent image representation based on the input image and the editing instruction;

computing, by a neural network based reward model, a reward score indicative of an alignment level between the edited image and the input image according to the editing instruction;

computing a loss objective based on the added noise, the estimated noise, and the reward score; and training the neural network based instructional image editing model based on the computed loss objective via backpropagation.

20. The non-transitory machine-readable medium of claim 19, the operations further comprising:

receiving, via the data interface, a second training dataset comprising a second input image, and a second editing instruction;

generating, by the neural network based instructional image editing model, a plurality of candidate edited images based on the second input image and the second editing instruction;

displaying the plurality of candidate edited images on a display;

receiving an indication of a quality associated with the plurality of candidate edited images; and training the neural network based reward model based on the indication.

\* \* \* \* \*